UNITED STATES PATENT OFFICE.

GILBERT S. DEAN, OF SAN FRANCISCO, CALIFORNIA.

IMPROVEMENT IN THE PROCESSES IN THE MANUFACTURE OF ARTIFICIAL STONE.

Specification forming part of Letters Patent No. 151,573, dated June 2, 1874; application filed September 29, 1873.

*To all whom it may concern:*

Be it known that I, GILBERT S. DEAN, of San Francisco city and county, State of California, have invented an Improved Process and Composition for the Manufacture of Concrete and Artificial Stone; and I do hereby declare the following description and accompanying drawings are sufficient to enable any person skilled in the art or science to which it most nearly appertains, to make and use my said invention or improvement without further invention or experiment.

Sand or gravel, cement, subcarbonate or subsulphate of lime and clay, or other insoluble silicate, are mixed together in varying proportions, according to the quality of the stone or concrete to be produced. The proportions are generally about nine (9) of sand or gravel to two (2) of cement and one (1) of subcarbonate or subsulphate of lime, but may vary to twenty (20) of sand and gravel to one (1) of cement and one (1) of sub-carbonate or sub-sulphate of lime. To this mixture from one (1) to ten (10) per cent. of clay or other insoluble silicate is added. Where sulphuric acid is contained in the stone the clay may be dispensed with. These ingredients, being mixed together, are moistened with a saponaceous solution containing glycerine. The saponaceous solution is made by taking from five (5) to fifteen (15) pounds of animal fat or oil and saponifying it with about one (1) pound of lime, potash, or soda, diluting the mixture with water until it forms ten (10) or twenty (20) gallons. The glycerine contained in the animal fat (no vegetable substance will answer) remains dissolved in the water, and to make the best stone another gallon of glycerine should be added to the solution.

The above process may be somewhat varied without essential alteration by moistening the mixture first with water, and after the first solidification has taken place wetting the stone or concrete with the solution.

The rationale of the process is as follows: The subcarbonate or subsulphate of lime hardens and improves the cement (apparently by abstracting and absorbing carbonic acid from it) and becomes itself a cement. The clay or sulphuric acid, in case of the artificial stone or concrete being exposed to fire, combines with the free lime eliminated from the subcarbonate, so that it does not slake when immersed in water. The fat acid of the saponaceous solution combines with the lime present, forming an insoluble and indestructible compound, resistant of water, thereby rendering the stone more solid, and buildings in which it may be used are, of course, always dry. The same combination renders the material tough and semi-elastic, thereby fitting it better for certain uses, *e. g.*, fire-proof roofs. The glycerine contained in the composition lowers the freezing-point of any water which may be present, so as to obviate any danger from frost.

Having thus described my invention, I claim—

The manufacture of an improved artificial stone and concrete by the process herein described, consisting in mixing together sand or gravel, cement, subcarbonate or subsulphate of lime, and clay or insoluble silicate, and moistening the mixture with a saponaceous solution containing glycerine, substantially as and for the purpose set forth.

In witness whereof I hereunto set my hand and seal.

GILBERT S. DEAN. [L. S.]

Witnesses:
JOHN L. BOONE,
C. M. RICHARDSON.